United States Patent
Burks

(10) Patent No.: US 9,062,449 B2
(45) Date of Patent: Jun. 23, 2015

(54) WALL CONSTRUCTION SYSTEM AND METHOD

(76) Inventor: Barclay Burks, Duluth, GA (US)

( * ) Notice: Subject to any disclaimer, the term of this patent is extended or adjusted under 35 U.S.C. 154(b) by 0 days.

(21) Appl. No.: 13/198,050

(22) Filed: Aug. 4, 2011

(65) Prior Publication Data

US 2012/0031027 A1 Feb. 9, 2012

Related U.S. Application Data

(60) Provisional application No. 61/401,043, filed on Aug. 5, 2010.

(51) Int. Cl.
| | | |
|---|---|---|
| *E04B 7/04* | (2006.01) | |
| *E04H 9/14* | (2006.01) | |
| *E04B 2/26* | (2006.01) | |
| E04B 1/16 | (2006.01) | |
| E04B 2/86 | (2006.01) | |

(52) U.S. Cl.
CPC . *E04B 2/26* (2013.01); *E04B 1/165* (2013.01); *E04H 9/14* (2013.01); *E04B 2/86* (2013.01)

(58) Field of Classification Search
CPC ..... E04B 1/24; E04B 2001/2684; E04B 1/26; E04B 1/0007; E04B 1/04; E04B 1/14; E04B 1/161; E04B 2/26; E04B 2/86; E04B 9/14
USPC ......... 52/91.2, 91.3, 92.1, 92.2, 23, 251, 264, 52/274, 293.3, 295, 742.14, 745.09, 52/742.13, 92.3, 93.2, 309.7, 309.16

See application file for complete search history.

(56) References Cited

U.S. PATENT DOCUMENTS

| | | | | |
|---|---|---|---|---|
| 1,657,441 | A * | 1/1928 | Huovinen | 52/293.2 |
| 3,898,779 | A * | 8/1975 | Tracy | 52/264 |
| 4,924,641 | A * | 5/1990 | Gibbar, Jr. | 52/204.1 |
| 4,970,838 | A * | 11/1990 | Phillips | 52/250 |
| 5,927,043 | A * | 7/1999 | Newkirk | 52/742.14 |
| 6,131,365 | A * | 10/2000 | Crockett | 52/794.1 |
| 6,434,900 | B1 * | 8/2002 | Masters | 52/283 |
| 6,519,904 | B1 * | 2/2003 | Phillips | 52/309.12 |
| 6,688,066 | B1 * | 2/2004 | Cottier et al. | 52/481.1 |
| 6,931,803 | B1 * | 8/2005 | Davis et al. | 52/251 |
| 7,033,116 | B1 * | 4/2006 | Ward et al. | 405/229 |
| 2001/0032425 | A1 * | 10/2001 | Terry | 52/251 |
| 2005/0247012 | A1 * | 11/2005 | Williams | 52/742.14 |
| 2008/0098669 | A1 * | 5/2008 | Lin | 52/92.2 |
| 2009/0133352 | A1 * | 5/2009 | Reymann | 52/576 |

* cited by examiner

*Primary Examiner* — Brian Glessner
*Assistant Examiner* — Brian D Mattei
(74) *Attorney, Agent, or Firm* — Mintz Levin Cohn Ferris Glovsky and Popeo, P.C.

(57) ABSTRACT

Systems and methods are provided for constructing a wall structure that is adapted to be secured to roof structure. A wall cavity is formed that extends from a foundation to the top of the wall structure. A reinforcement member (e.g., rebar) is provided that extends continuously through the wall structure, where the reinforcement member is secured at one end within said foundation and at the other end to said roof structure. A first material (e.g., polystyrene or an admixture of coal-ash and concrete) is disposed within said wall cavity from the foundation to a location below (e.g., 10 inches below) the top of the wall structure. A second material (e.g., 3000 to 4000 PSI concrete) is disposed within the wall cavity from the location to the top of the wall structure. The wall structure may be formed from, for example, hollow-core concrete blocks or parallel sheets of fibrous wallboard (backerboard).

16 Claims, 9 Drawing Sheets

Wall Section

Top View

Side View

Wall Section

Wall Section

Wall Section

*Wall Section*

Wall Section

US 9,062,449 B2

WALL CONSTRUCTION SYSTEM AND METHOD

CROSS-REFERENCE TO RELATED APPLICATION

This application claims priority to U.S. provisional patent application No. 61/401,043, filed Aug. 5, 2010, which is hereby incorporated by reference herein in its entirety.

FIELD OF THE INVENTION

Some embodiments of the present invention relate to systems and methods for constructing high-strength walls within a building such as, for example, a single-story residential home.

BACKGROUND OF THE INVENTION

Hollow-core concrete blocks have been widely used for wall construction for over a century. Traditionally, the blocks are laid in a running bond pattern (alternating seam) with reinforced steel referred to as "rebar" for reinforcement, where generally the rebar is not placed in an underlying concrete slab (if any), is used only in corners, and terminates at the top of the wall. Once the blocks are installed, all the hollow cores in the wall are filled from bottom to top with the same material. In one example, all the hollow cores are filled with concrete. Although this can produce a sturdy wall, this method is costly due to the relatively high cost of concrete. In another example, all the hollow cores are filled with a less expensive material such as an admixture that includes fly-ash. However, the use of such an admixture instead of concrete typically produces a wall of lower strength. In some traditional approaches, roof trusses are fastened to bolts secured in the wall.

In view of the foregoing, it would be desirable to provide cost-effective systems and methods for constructing buildings with high-strength walls. For example, it would be desirable to provide cost-effective systems and methods for constructing walls that make the resulting building highly resistant to heavy winds (e.g., from hurricanes).

SUMMARY OF THE INVENTION

In an aspect, a building structure and method for its construction are provided, where the building structure includes a foundation made from, for example, 3000 PSI (pounds per square inch) to 4000 PSI concrete. A wall structure having a cavity that extends from the foundation to the top of the wall structure is also provided, where the cavity includes both a first material and a second material disposed therein. In a preferred embodiment, the first material is less expensive than the second material, and more of the first material is disposed within the cavity than the second material. For example, the first material (e.g., polystyrene or a flowable admixture including coal-ash) may extend from the foundation to a given location below the top of the wall. Coal-ash, which includes fly-ash and/or bottom-ash, is a by- and waste-product of coal-fired combustion. The second material (e.g., 10 inches of 3000-4000 PSI concrete) may form a "bond" beam that extends from the given location to the top of the wall. The building structure also includes a roof structure (e.g., a steel roof truss) and a reinforcement member (e.g., one or more 10-foot or larger segments of 5/8 inch rebar), where the reinforcement member is secured at one end in the foundation, extends continuously through the wall cavity, and is secured to the roof structure. One or more J-bolts or other fasteners may be incorporated within the bond beam for fastening to the roof structure. The roof structure may be finished with continuous form steel or fibrous concrete and secured with metal hurricane straps.

In an embodiment, the wall structure includes hollow-core concrete blocks. The concrete blocks may be laid in a running bond pattern (alternating seam) with the rebar extending continuously therethrough. Then, the first and second materials may be flowably-filled into the hollow core, in that order, after the concrete blocks have been laid.

In another embodiment, the wall structure includes two sheets of reinforced fibrous wallboard product known as "backer-board". The two sheets of backer-board may be disposed in parallel in order to form a wall structure having a cavity. The backer-board may be manufactured by, for example, the U.S. Gypsum Corporation or other corporation. Any number and size(s) of backer-board sheets may be fastened to one another and then disposed in parallel to a complimentary arrangement of fastened backer-board sheets in order to form a hollow wall structure of a suitable height and width. The cavity may be completely (or at least substantially) continuous both vertically (i.e., from the foundation to the top of the wall structure) and horizontally. Once the backer-board sheets are disposed in parallel, the first and second materials may be flowably-filled into the cavity, in that order.

In yet another embodiment, the wall structure includes a polystyrene/backer-board panel system. Each panel may include an extruded polystyrene core "sandwiched" between two sheets of backer-board. The panels may be "pre-engineered" in that they arrive to the construction site ready for assembly, with the extruded polystyrene core already fastened to the backer-board with, for example, an adhesive. Any number and size(s) of pre-engineered panels may be fastened together to form a wall structure of a suitable height and width.

In some embodiments, a multi-story building is provided. For example, the first story wall structure made in accordance with embodiments of the present invention may exceed all ASTD standards for load bearing capacity for the addition of a second story. Thus, in some embodiments, the second story may be added utilizing steel trusses with a deck of fibrous concrete. The second story may be anchored by interlocking the rebar from the first story and carrying the resulting rebar through to the roof trusses and anchoring in the same manner as described above in connection with the single story structure. In some embodiments, the wall structure on the second story may be constructed with steel studs and fibrous concrete wall board and filled as described above in connection with the single story structure.

BRIEF DESCRIPTION OF THE DRAWINGS

For a better understanding of the present invention, reference is made to the following description, taken in conjunction with the accompanying drawings, in which like reference characters refer to like parts throughout, and in which.

DETAILED DESCRIPTION OF THE INVENTION

Figure 1:
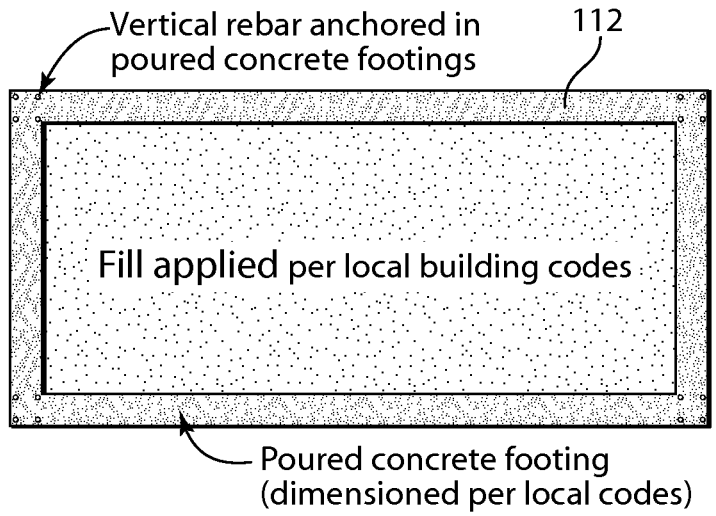
FIGS. 1-7 show a high-strength wall structure and corresponding method of manufacture in accordance with some embodiments of the present invention.
Figure 2:
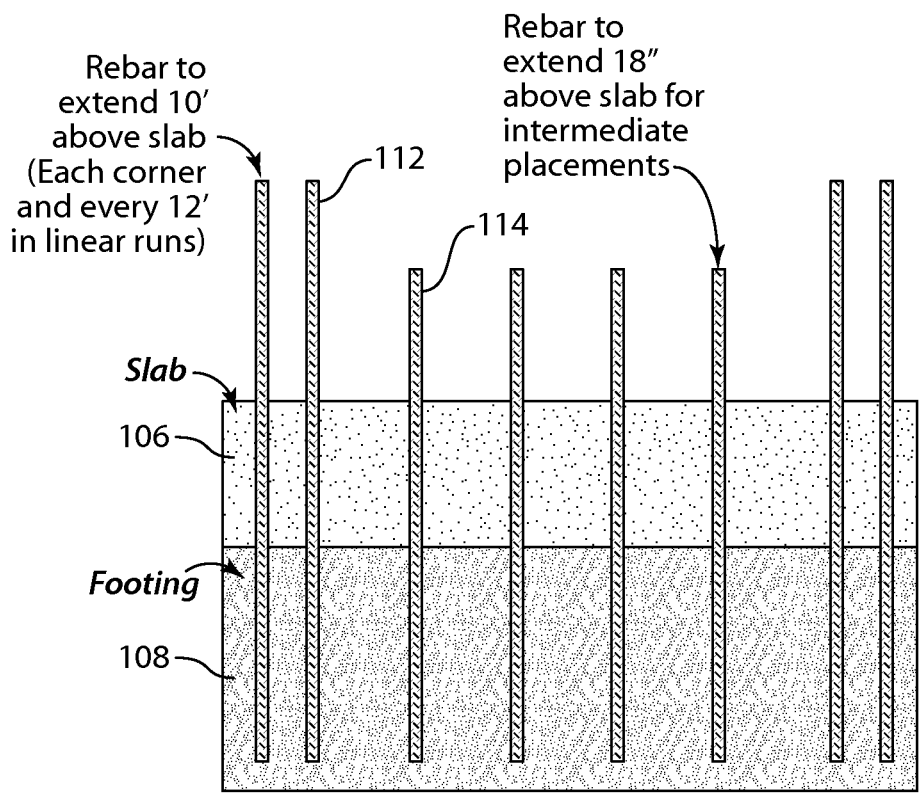
Figure 3:
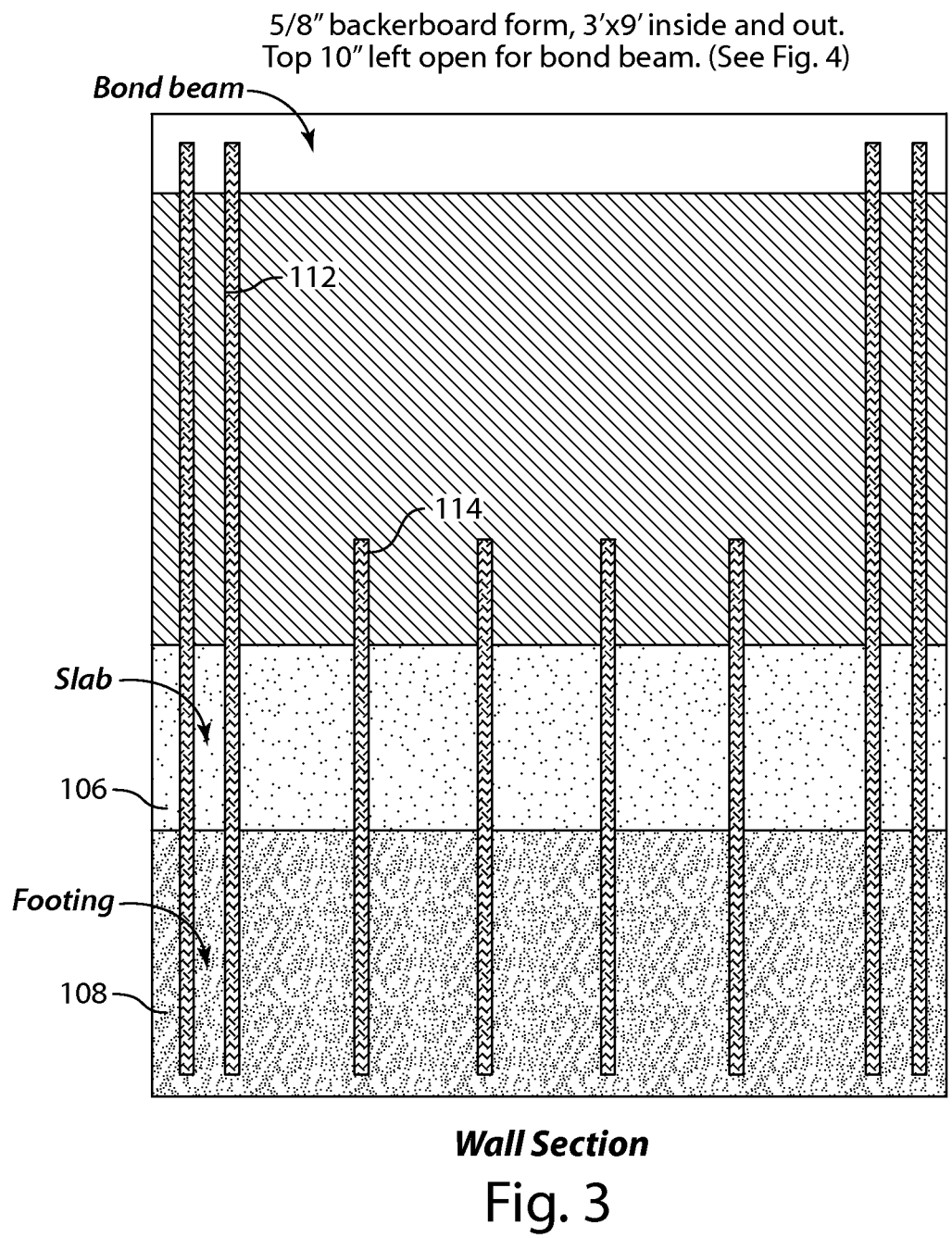
Figure 4:
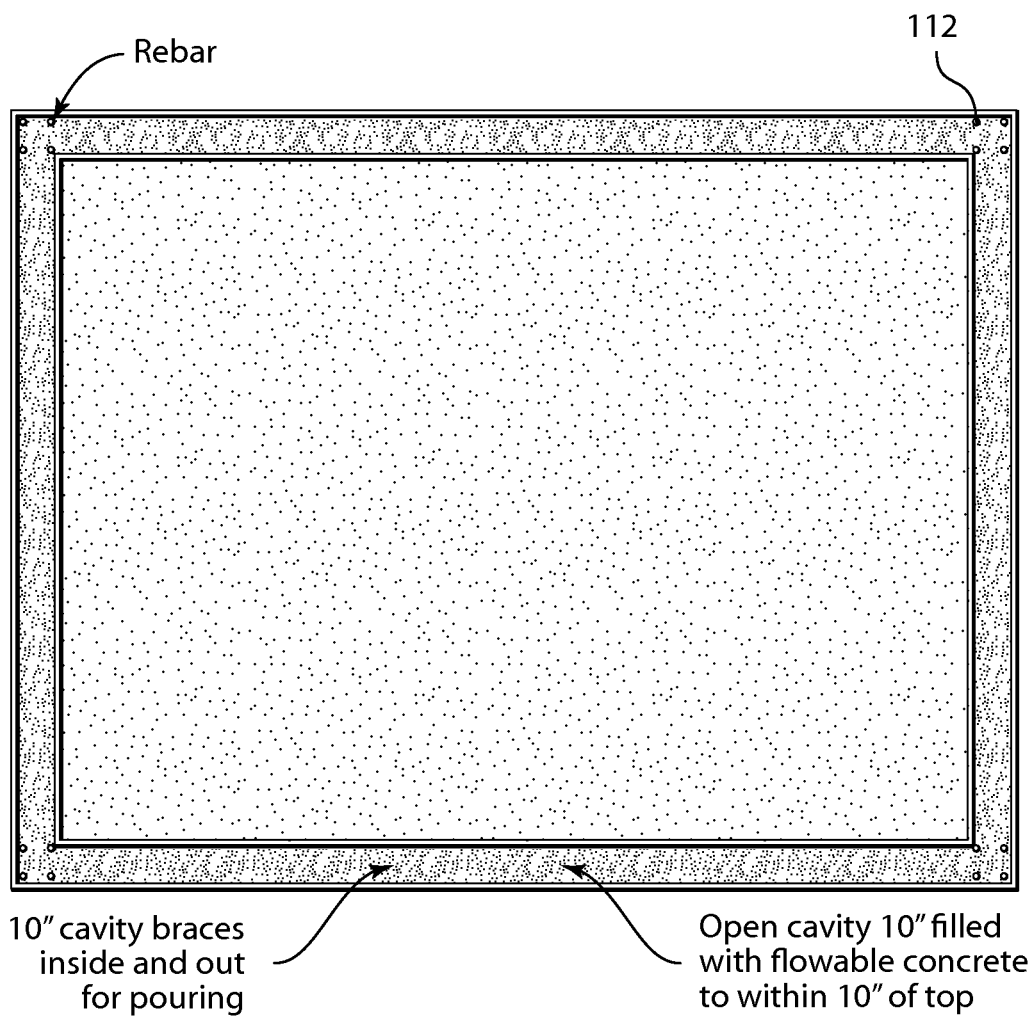
Figure 5:
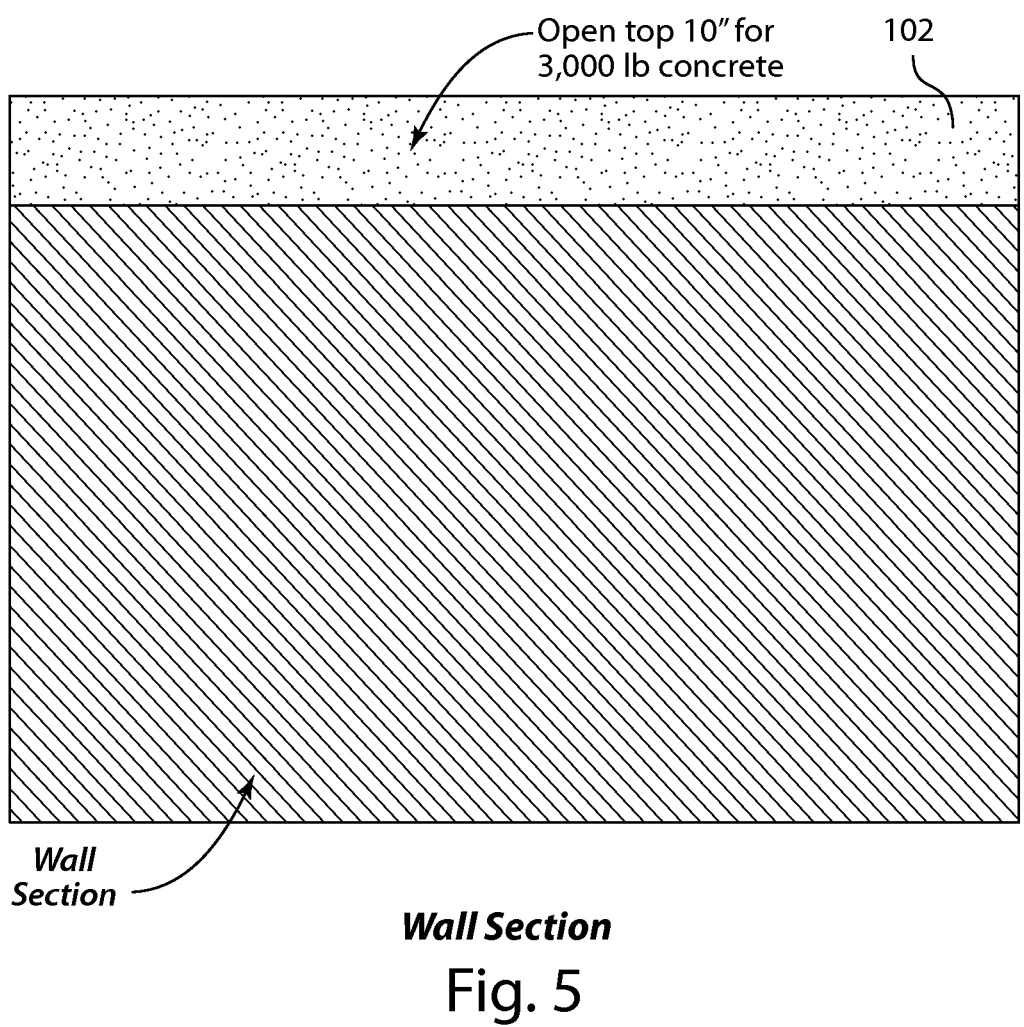
Figure 6:
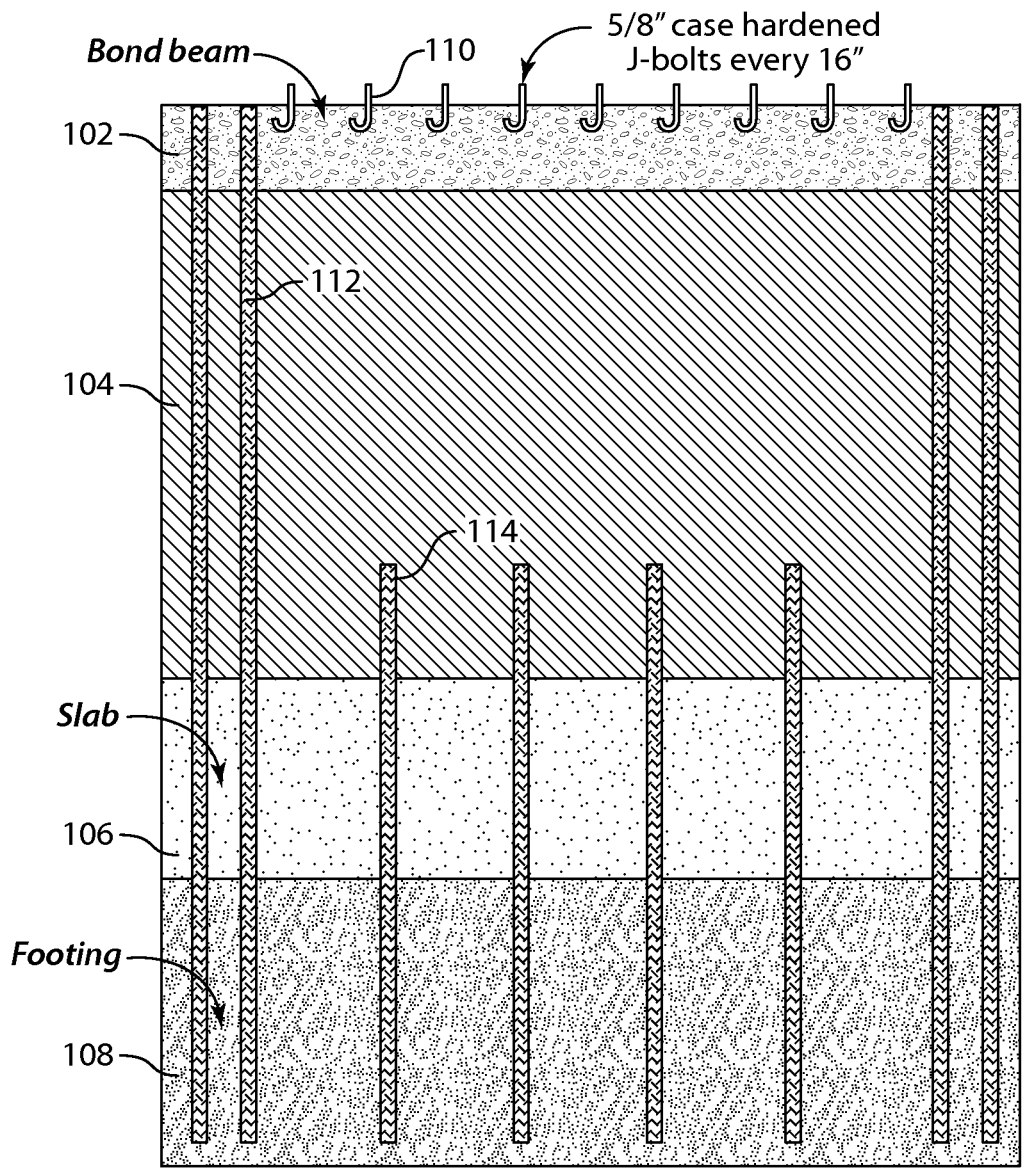
Figure 7:
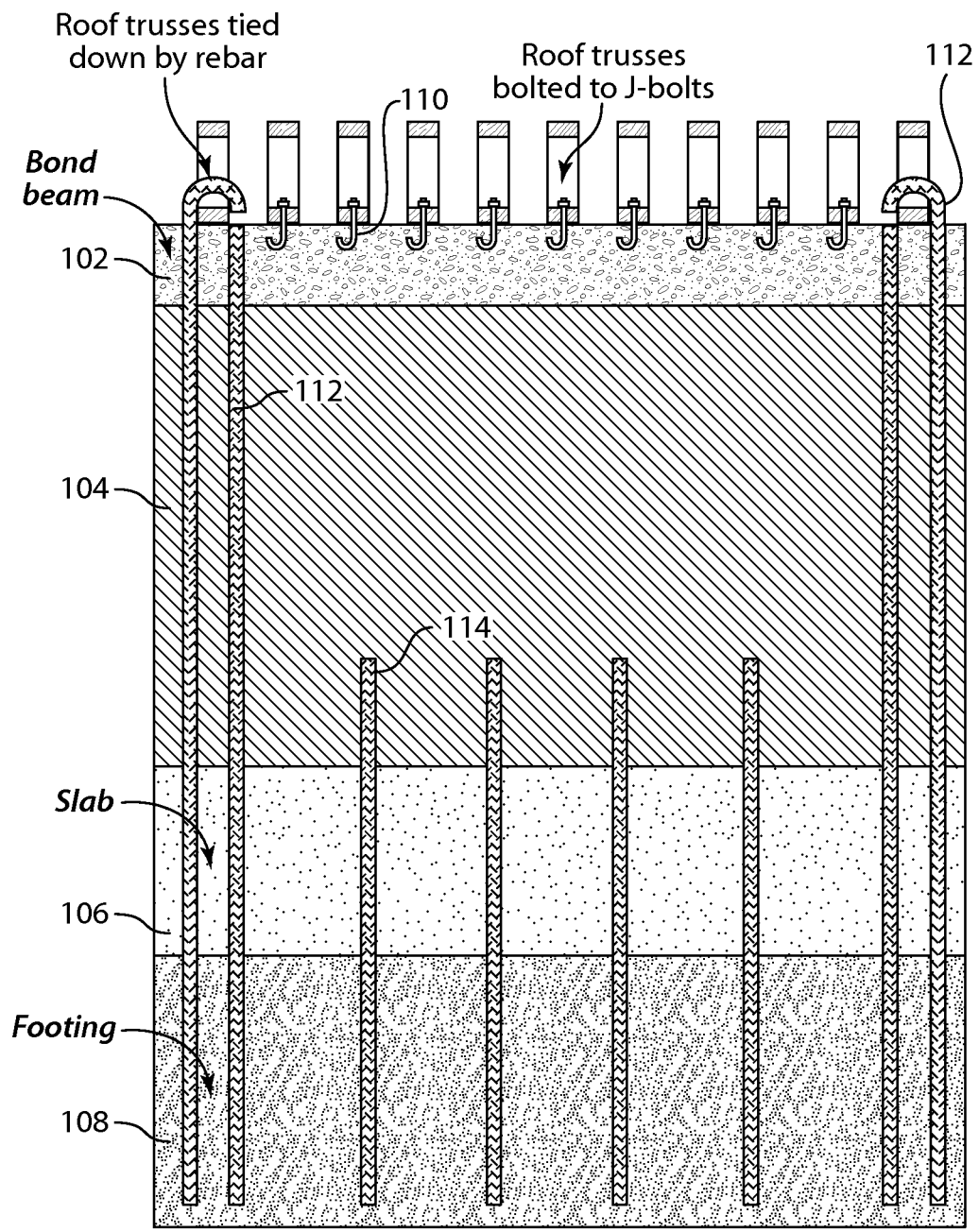

FIGS. 1-7 show a wall structure 100 and corresponding method of manufacture in accordance with some embodiments of the present invention. Referring primarily to FIG. 7, wall structure 100 may provide resistance to heavy winds (e.g., from hurricanes) and overall stability within a resulting building. Wall structure 100 includes a "bond" beam 102 disposed within a top portion of the wall structure. The bond beam may be completely (or at least substantially) continuous throughout the top portion each wall structure and across all wall structures in the building. For example, the bond beam may be disposed within the top 5 to 15 inches of each wall structure, with a preferred height of the bond beam being 10 inches. Wall structure 100 also includes material 104 that may be disposed within the wall structure from just above slab 106 and footing 108 (sometimes collectively referred to herein as the foundation) to just below the bond beam. Suitable wall structures may include wall structures formed from hollow-core concrete blocks or parallel sheets of backer-board (e.g., 3' by 9' inside and out), as described in greater detail below in connection with FIGS. 8-10. In a preferred embodiment, the bond beam comprises concrete (e.g., 3000-4000 PSI concrete). The foundation (e.g., slab 106 and/or footing 108) also preferably comprises concrete (e.g., 3000-4000 PSI concrete, depending on soil condition) as is described in greater detail below. Material 104 may include a material of lower strength than material 102 such as, for example, coal-ash, polystyrene, or any other suitable raw (preferably waste) material that may be available within a given geographic region. Material 104 may also include cement (e.g., 5% cement by weight) in order to provide a given compressive strength. J-bolts 110 (e.g., 10-inch long, ⅝-inch case hardened J-bolts placed every 16 inches) or other fasteners may be disposed within the bond beam at predetermined intervals (e.g., every 16 inches) and may be used to secure the wall structure to a roof structure (e.g., a steel roof truss). When material 104 (e.g., coal-ash) is less costly than material 102, the embodiment show in FIG. 1 (which uses material 104 instead of material 102 only) reduces construction costs. Wall structure 100 may also include continuous segment(s) of reinforced steel known as rebar 112 (e.g., 10-foot or larger segment(s) of ⅝ inch or larger rebar) that extend through the entire height of the wall. Namely, one end of a rebar segment may be secured within the foundation of the building and the other end of the rebar may be secured to the roof structure (e.g., about 10 feet above slab 106, by bending a portion of the rebar that extends above bond beam 102 over a portion of the roof structure, as shown in FIG. 7). In a preferred embodiment, four segments of ⅝ inch rebar may be clustered together and disposed through the wall structure every 12 feet (see e.g., FIGS. 1 and 2). In some embodiments, every corner also has four rebar segments regardless of whether it has been 12 feet since the last cluster of rebar segments. In some embodiments, intermediate placements of rebar 114 (e.g., in clusters of two or four segments of rebar) may extend 18 inches above slab 106 (see e.g., FIG. 2).

In some embodiments, footing 108 may include multiple concrete footings formed in a 24-inch by 18-inch checkerboard pattern. The footings are poured with the rebar segments in the locations in which the rebar segments will be disposed within the wall structure. A steel rebar reinforced 6-inch slab 106 of concrete may then be poured on the footing based on the footprint of the building.

Figure 8:
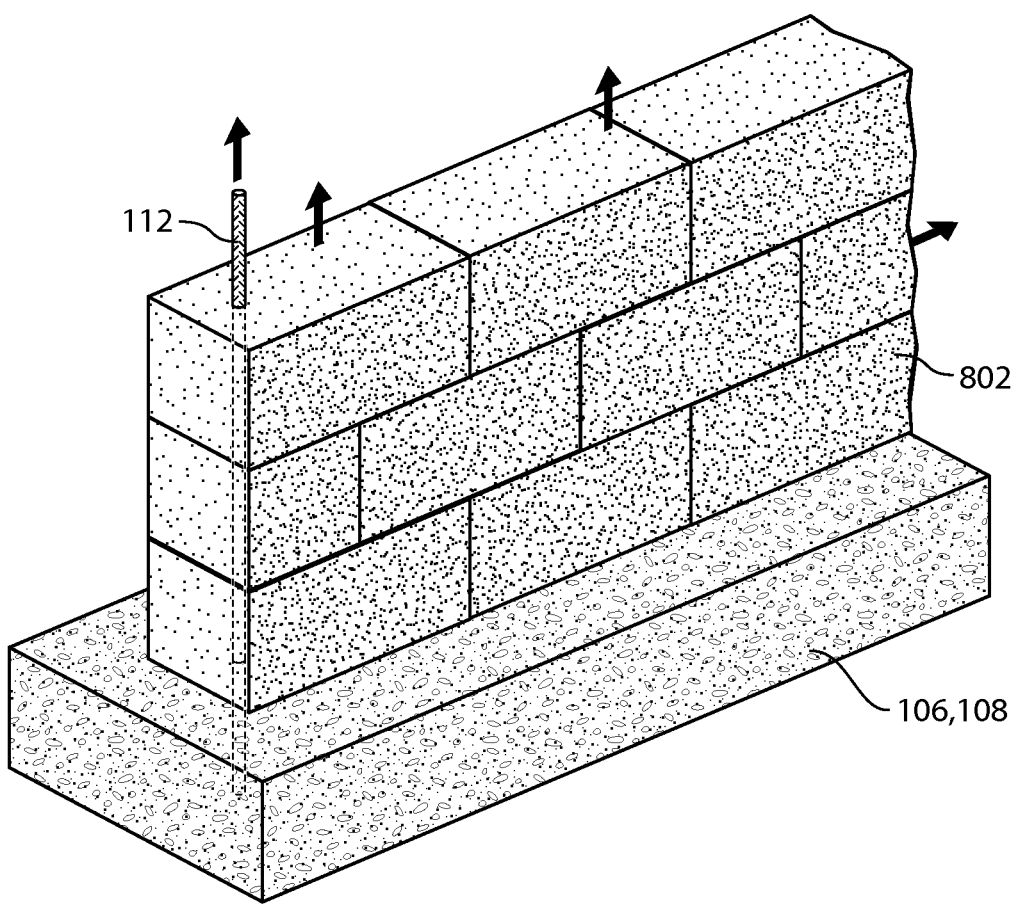
FIG. 8 shows an embodiment of a wall structure formed from hollow-core concrete blocks in accordance with the present invention.

FIG. 8 shows an embodiment of a wall structure 100 formed from hollow-core concrete blocks 802 in accordance with the present invention. In some embodiments, the concrete blocks may be laid in a running bond pattern (alternating seam) from the foundation (e.g., footing 108 and/or slab 106) to the top of the wall structure (e.g., which is shown as the top of bond beam 102 in FIG. 7). Rebar segment(s) 112 and/or 114 may extend through hollows in the concrete blocks. Material 104 may be flowably-filled into the concrete hollows from foundation 106 to a given height in wall structure 100 below the top. Material 102 may be flowably-filled into the concrete hollows from that height to the top 112 of the wall structure. All utilities (e.g., water and gas lines) may be placed in wall structure 100 prior to flowably filling the hollow cores.

Figure 9:
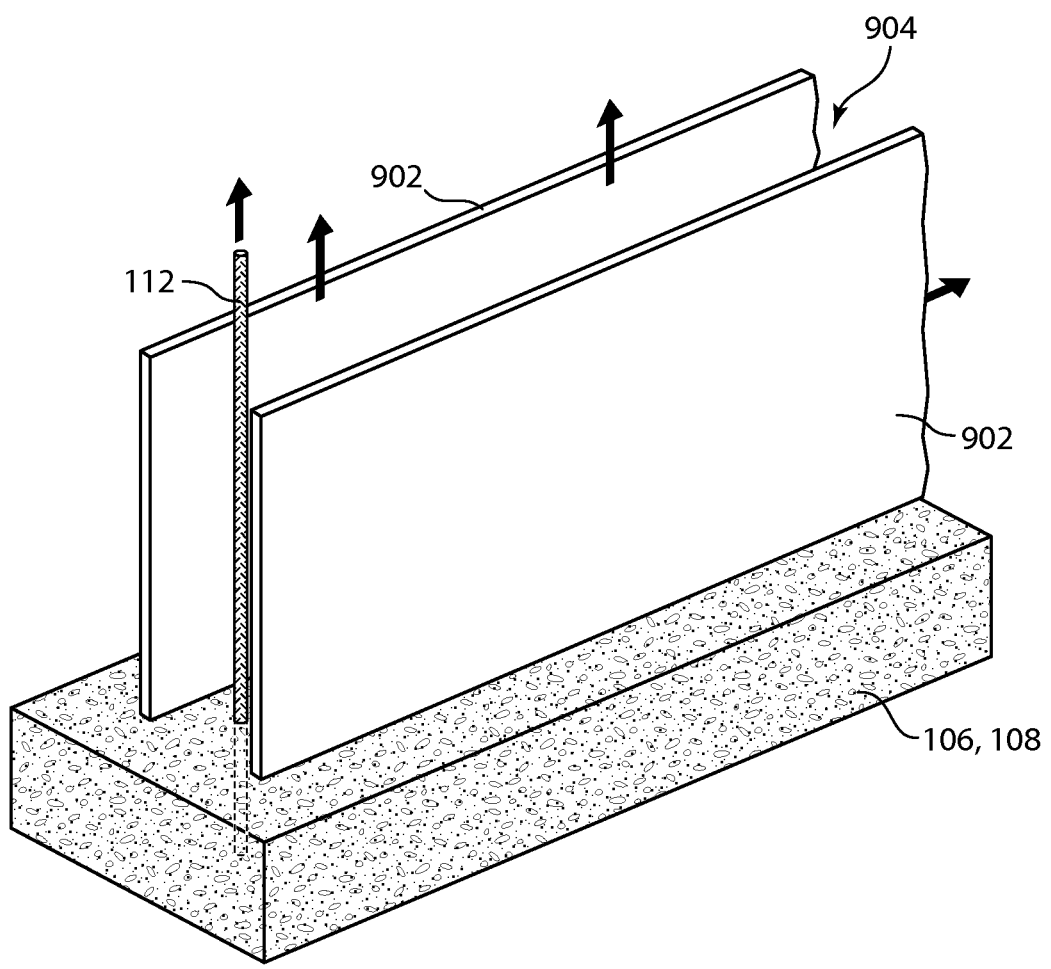
FIG. 9 shows an embodiment of a wall structure formed from two sheets of backer-board disposed in parallel in accordance with the present invention.

FIG. 9 shows an embodiment of a wall structure 100 formed from two sheets of backer-board 902 disposed in parallel (e.g., 10 inches apart) in accordance with the present invention. As shown, the parallel positioning of the backer-board sheets forms a cavity 904.

The backer-board may be, for example, ½-inch backer-board manufactured by the U.S. Gypsum Corporation or other corporation. The backer-board sheets may be positioned such that cavity 904 has a width of, for example, 8 to 12 inches. In some embodiments, the backer-board in conjunction with a flowable-fill cavity forms a cohesive unit that is fastened to the foundation by the rebar extending through the entire wall system. The backer-board sheets may be 1-by-1.5 meter sheets or any other suitable size sheets or combination of sizes (e.g., 3 feet by 9 feet). Any number and size(s) of backer-board sheets may be fastened to one another and then disposed in parallel to a complimentary arrangement of fastened backer-board sheets in order to form a wall structure of a suitable height and width.

In some embodiments, the backer-board sheets are held together with a series of steel reinforcement rods bolted through from one side of the wall to the other, where the integrity of the interior cavity is secured with donut shaped concrete tubes. In some embodiments, pillars consisting of 3000 psi concrete are formed and poured in each corner and at 12 foot intervals. The cavity within the wall may be otherwise substantially continuous both vertically (i.e., from the foundation to the top of the wall structure) and horizontally (i.e., from one corner of the building structure to the next), with the exception that openings may be made (e.g., for doors and windows) and that various hardware may be used (e.g., within the cavity) to fasten the backer-board sheets in place. In some embodiments, openings for windows, doors and other cavities are pre-formed using steel forms prior to pouring material(s) into the wall cavity.

Rebar segment(s) 112 and/or 114 may extend through cavity 904. In some embodiments, material 104 may be flowably-filled into cavity 904 from the foundation (e.g., footing 108 and/or slab 106) to a height in wall structure 100 below the top. Material 102 may be flowably-filled into the cavity from that height to the top of the wall structure. All utilities (e.g., water and gas lines) may be placed within wall structure 100 prior to filling cavity 904. Advantageously, the wall structure shown in FIG. 9 requires minimal tools for assembly, all of which can be manual (i.e., non-electrical) tools. Similarly, in some embodiments, the structures shown in FIGS. 8 and 10 also can be assembled without electrical tools.

It will be understood that the physical characteristics of the backer-board wall structure shown in FIG. 9 are largely dependent on the material 104 used in the flowable fill, and can be readily engineered to meet most structural requirements. For example, a fine-graded fly-ash will typically exhibit lower strengths than a coarser ash or a combination of fly-ash and bottom-ash (with bottom ash typically having a higher strength than fly-ash). The variables having significant impact on wall strength are the particle size, binder (e.g., cement) used, and the percentage of binder added. Engineered flowable fill can exhibit strengths from, for example, 50 PSI to over 3000 PSI. Typically, flowable fill is approximately 90 pounds per cubit foot. However, wall density (which affects the thermal properties of the wall) can be manipulated to bulk densities between, for example, 70 pounds per cubic foot to 120 pounds per cubic foot with the addition of admixtures.

Figure 10:
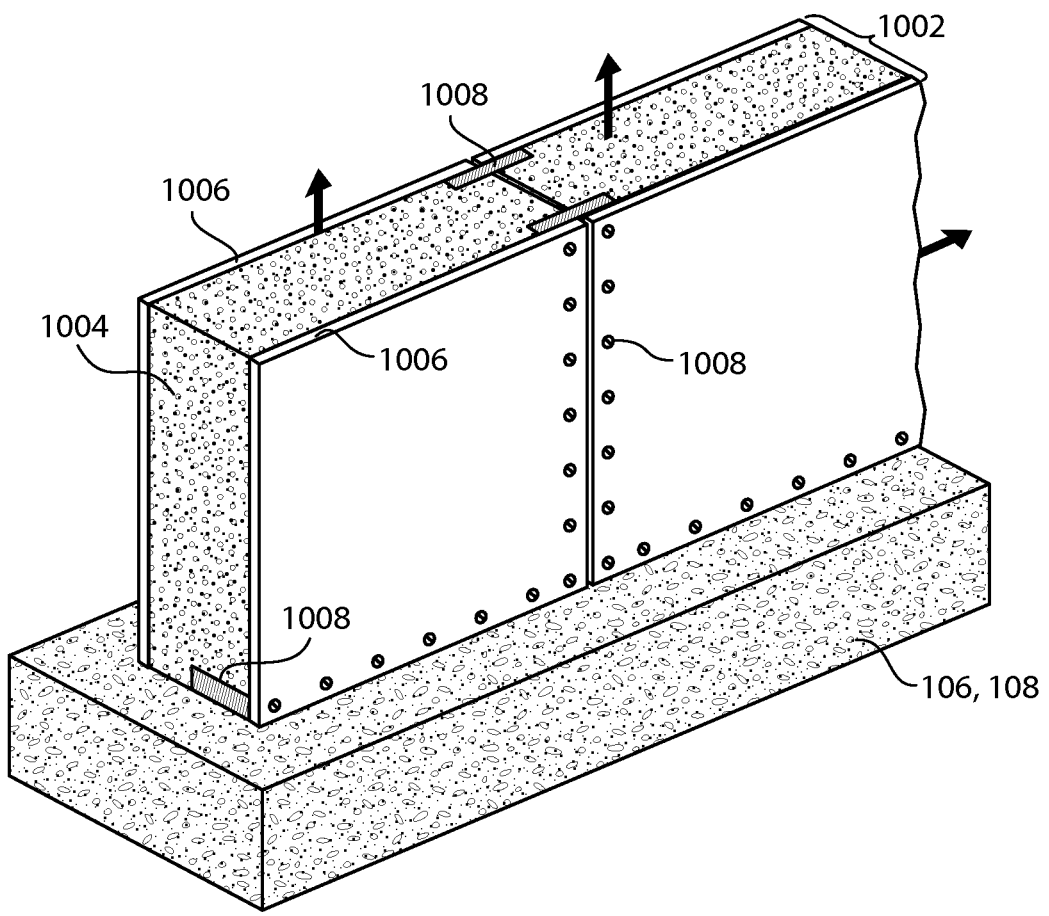
FIG. 10 shows an embodiment of a wall structure formed with polystyrene/backer-board panels in accordance with the present invention.

FIG. 10 shows an embodiment of a wall structure 100 formed from polystyrene/backer-board panel(s) 1002 in accordance with the present invention. Each panel may include an extruded polystyrene core 1004 (e.g., 3.5 or 4 inches thick) "sandwiched" between two sheets of backer-board 1006 (e.g., ½-inch backer-board). The panels may be "pre-engineered" in that they arrive to the construction site ready for assembly, with the extruded polystyrene core already fastened to the backer-board with, for example, an adhesive. The panels may come in one or more sizes, such as 0.91 meters wide by 2.44 meters high. In some embodiments, the pre-engineered panel at the top of the wall has a 10" portion in which no polystyrene is included such that the bond beam can be poured at the construction site. In some embodiments, the panel system has pre-fabricated holes or other hollow cavities through which the rebar can pass from the foundation to the roof structure. Utilities can be placed in a mantel fashion prior to forming the wall section. Any suitable hardware 1008 may be provided for fastening the pre-engineered panels to one another and to the foundation. The joints at the panel connections may be taped (e.g., with fiberglass mesh) to prevent or reduce cracking The polystyrene/backerboard panel system 1002 can be put together to form, for example, a single-family home.

Thus it is seen that systems and methods are provided for constructing walls within a building (e.g., high-strength walls). Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the inventions disclosed herein. Other, unclaimed inventions are also contemplated. The inventor reserves the right to pursue such inventions in later claims.

What is claimed is:

1. A wall structure adapted to be secured to a roof structure, said wall structure comprising:
   first and second reinforced fibrous wallboards disposed substantially parallel to one another to form a wall cavity therebetween extending from a foundation to a top of said wall structure;
   a reinforcement member extending continuously from within said foundation through said wall structure to a location above said top of said wall structure, said reinforcement member being secured at one end within said foundation and adapted to be secured at the other end to said roof structure;
   a first material disposed within said wall cavity from said foundation to a location below said top of said wall structure, said reinforcement member being in direct contact with said first material; and
   a second material disposed within said wall cavity from said location to said top of said wall structure, wherein said first material is different than said second material.

2. The wall structure of claim 1, wherein said reinforcement member comprises steel.

3. The wall structure of claim 2, wherein said reinforcement member consists essentially of a continuous segment of rebar.

4. The wall structure of claim 1, wherein said first material comprises a flowable fill.

5. The wall structure of claim 4, wherein said flowable fill comprises an admixture of coal-ash and concrete.

6. The wall structure of claim 1, wherein said second material is 3000 to 4000 PSI concrete.

7. The wall structure of claim 1, wherein said location below said top of said wall structure to said top of said wall structure within which said second material is disposed is about 5 to 15 inches in height.

8. The wall structure of claim 1, wherein said wall structure further comprises fasteners disposed within said second material for fastening to said roof structure.

9. The wall structure of claim 8, further comprising said roof structure, wherein:
   said roof structure comprises a roof truss; and
   said fasteners comprise J-bolts disposed within said second material every 16 inches, said J-bolts being adapted for fastening to said roof truss.

10. The wall structure of claim 1, further comprising a second reinforcement member extending continuously from within said foundation through said wall structure to a location above said top of said wall structure, said second reinforcement member being secured at one end within said foundation and adapted to be secured at the other end to said roof structure, wherein said reinforcement member and said second reinforcement member form a cluster.

11. A method for constructing a wall structure adapted to be secured to a roof structure, said method comprising:
    disposing first and second reinforced fibrous wallboards substantially in parallel to one another to form a wall cavity that extends from a foundation to a top of said wall structure;
    providing a reinforcement member between said first and second reinforced fibrous wallboards, said reinforcement member extending continuously from within said foundation through said wall structure to a location above said top of said wall structure, said reinforcement member being secured at one end within said foundation and adapted to be secured at the other end to said roof structure;
    filling said wall cavity from said foundation to a location below said top of said wall structure with a first material, said reinforcement member being in direct contact with said first material; and
    filling said wall cavity from said location to said top of said wall structure with a second material.

12. The method of claim 11, wherein said reinforcement member consists essentially of a continuous segment of rebar.

13. The method of claim 11, wherein said first material is a flowable fill comprising an admixture of coal-ash and concrete.

14. The method of claim 11, wherein said second material comprises 3000 to 4000 PSI concrete, wherein the resulting height of said second material within said cavity is about 5 to 15 inches.

15. The method of claim 11, further comprising disposing J-bolts within said second material, wherein said J-bolts are adapted to fasten said roof structure to said wall structure.

16. The method of claim 11, wherein said disposing comprises disposing said first and second reinforced fibrous wallboards such that said wall cavity comprises said reinforcement member, and a second reinforcement member that extends continuously from within said foundation through said wall structure to a location above said top of said wall structure, said second reinforcement member being secured at one end within said foundation and adapted to be secured at the other end to said roof structure, wherein said reinforcement member and said second reinforcement member form a cluster.

\* \* \* \* \*